US008405644B2

(12) United States Patent
Kato

(10) Patent No.: US 8,405,644 B2
(45) Date of Patent: Mar. 26, 2013

(54) ELECTRO-OPTICAL DEVICE, AND ELECTRONIC APPARATUS HAVING THE SAME

(75) Inventor: Tomotoshi Kato, Tottori (JP)

(73) Assignee: Sony Corporation, Tokyo (JP)

( * ) Notice: Subject to any disclaimer, the term of this patent is extended or adjusted under 35 U.S.C. 154(b) by 427 days.

(21) Appl. No.: 12/560,681

(22) Filed: Sep. 16, 2009

(65) Prior Publication Data

US 2010/0085335 A1 Apr. 8, 2010

(30) Foreign Application Priority Data

Oct. 8, 2008 (JP) ................................ 2008-261366

(51) Int. Cl.
*G06F 3/038* (2006.01)

(52) U.S. Cl. ...................................... 345/204; 345/100

(58) Field of Classification Search ........................ None
See application file for complete search history.

(56) References Cited

U.S. PATENT DOCUMENTS 6,362,643 B1 * 3/2002 Kim ......................... 324/760.02
6,437,767 B1 * 8/2002 Cairns et al. .................. 345/100
7,138,967 B2 * 11/2006 Kimura ........................... 345/76
7,145,545 B2 * 12/2006 Zebedee et al. ............... 345/100
7,209,130 B2 * 4/2007 Tsujino et al. ................ 345/204
7,911,436 B2 * 3/2011 Lee et al. ....................... 345/100
8,098,225 B2 * 1/2012 Murakami et al. ............ 345/100
2004/0239603 A1 * 12/2004 Toriumi et al. ................. 345/89
2006/0187175 A1 * 8/2006 Lo et al. ........................ 345/100
2006/0232538 A1 10/2006 Kobashi et al.
2008/0042963 A1 2/2008 Fujita

FOREIGN PATENT DOCUMENTS

JP 2005-107382 4/2005
JP 2006-285233 10/2006
JP A-2006-276794 10/2006
JP 2007-095190 4/2007
JP 2007-179017 7/2007
JP 2008-033296 2/2008
JP A-2008-033247 2/2008

OTHER PUBLICATIONS

Notice of reasons for refusal issued in connection with Japanese Patent application No. 2008-261366, dated Dec. 4, 2012. (3 pages).

* cited by examiner

*Primary Examiner* — Jason Olson
(74) *Attorney, Agent, or Firm* — K&L Gates LLP

(57) ABSTRACT

An electro-optical device includes a plurality of scan lines, a plurality of data lines, a plurality of pixels respectively provided at intersections between the plurality of scan lines and the plurality of data lines, and a scan line drive circuit that applies a selection voltage to the scan lines in a predetermined sequence. The scan line drive circuit is composed of a first scan line drive circuit disposed at one side of the scan line and a second scan line drive circuit disposed at the other side of the scan line. The first scan line drive circuit applies the selection voltage to some of the scan lines, and the second scan line drive circuit applies the selection voltage to the remaining scan lines.

9 Claims, 7 Drawing Sheets

ELECTRO-OPTICAL DEVICE, AND ELECTRONIC APPARATUS HAVING THE SAME

BACKGROUND

1. Technical Field

The present invention relates to an electro-optical device and an electronic apparatus having the electro-optical device.

2. Related Art

Heretofore, an electro-optical device such as a liquid crystal display device has been widely known as a display device for displaying an image. Such a liquid crystal display device has an element substrate, an opposing substrate disposed so as to face the element substrate, and a liquid crystal sandwiched between the element substrate and the opposing substrate. A liquid crystal display similar to the above is known that includes a control circuit that alternately applies a voltage VCOMH and a voltage VCOMH to a common electrode, a scan line drive circuit that sequentially applies a selection voltage to a plurality of scan lines and a data line drive circuit that alternately supplies an image signal with a positive polarity and an image signal with a negative polarity to a plurality of data lines when a scan line is selected, the image signal with the positive polarity having a potential higher than the voltage VCOML and the image signal with the negative polarity having a potential lower than that of the voltage VCOMH. JP-A-2008-33247 is an example of the related art.

Here, so-called common electrode divisional driving (COM divisional driving) in which the common electrode is divided into divisional common electrodes for each horizontal line and the voltage VCOML or the voltage VCOMH is applied to the respective divisional common electrodes, is carried out. By using the COM divisional driving technique, it is possible to prevent display quality from being degraded. JP-A-2006-276794 that is another example of the related art, discloses a liquid crystal display device including an element substrate on which a scan line drive circuit and a data line drive circuit are disposed.

Meanwhile, in recent years, in consideration of installation of the above type of liquid crystal display device in an electronic apparatus, it is required to reduce a region of a frame portion of a display section in the electronic apparatus. However, in a case where the COM divisional driving technique is used as in the liquid crystal display device described in JP-A-2008-33247, drivers for COM divisional driving are usually provided at both of right and left sides of a display panel, respectively in order to take a countermeasure for crosstalk, resulting in difficulty in reduction of the frame portion of the display panel.

In addition, the scan line drive circuit is usually provided at only one side as in the liquid crystal display device described in JP-A-2006-276794. However, the balance of the display panel between right and left frame portions is impaired. Further, even when the drivers for COM divisional driving are not mounted, it is required that the right and left frame portions are equalized to each other in consideration of the installation of the display panel in an electronic apparatus. However, when the right and left frame portions are made to be balanced, a trim area may be enlarged and a space in which the scan line drive circuit is not provided becomes wasted.

SUMMARY

An advantage of some aspects of the invention is that it provides an electro-optical device capable of improving the balance between right and left regions of a frame portion and allowing the frame portion to be miniaturized, and an electronic apparatus having the electro-optical device.

An electro-optical device according to a first aspect of the invention includes a plurality of scan lines, a plurality of data lines, a plurality of pixels respectively provided at intersections between the plurality of scan lines and the plurality of data lines, and a scan line drive circuit that applies a selection voltage to the scan lines in a predetermined sequence. The scan line drive circuit is composed of a first scan line drive circuit disposed at one side of the scan line and a second scan line drive circuit disposed at the other side of the scan line. The first scan line drive circuit applies the selection voltage to some of the scan lines, and the second scan line drive circuit applies the selection voltage to the remaining scan lines.

Since the scan line drive circuits are disposed at both end sides of the scan line, the scan line drive circuits can be disposed at both sides of the display panel so that balance between regions of a frame portion is improved. In addition, the number of drivers in one scan line drive circuit can be reduced and an area of the circuit is reduced, resulting in reduction of the region of the frame portion as compared to a case that the scan line drive circuit is disposed at one side.

In accordance with the electro-optical device according to the first aspect of the invention, each of the first scan line drive circuit and the second scan line drive circuit preferably has shift registers provided corresponding to the plurality of scan lines. Supplying of signals between the shift registers belonging to the first scan line drive circuit and the shift registers belonging to the second scan line drive circuit, is performed via the scan lines. With this configuration, scanning can be stopped when a scan line is broken so that checking of disconnection of the scan lines can be performed.

In accordance with the electro-optical device according to the first aspect of the invention, the plurality of scan lines are preferably connected to output terminals of the selection voltage of the first scan line drive circuit and the second scan line drive circuit alternately for each one scan line. With this configuration, the number of drivers in one scan line drive circuit can be made a half of that of the scan line drive circuit disposed only at one side. Namely, the area of the circuit can be can be reduced to be a half so that it is possible to efficiently reduce the region of the frame portion. In addition, the drivers of the scan line drive circuit can be disposed at both sides of a display region in good balance, thereby achieving a structure capable of eliminating a dead space.

In accordance with the electro-optical device according to the first aspect of the invention, the plurality of scan lines are preferably connected to output terminals of the selection voltage of the first scan line drive circuit and the second scan line drive circuit alternately for each two or more scan lines. For example, the scan line drive circuit is constituted so as to have a shift register having two of more stages of flip flops corresponding to the scan lines connected to its own terminals. In a case where an output pulse of the shift register belonging to one scan line drive circuit is input to a flip flop belonging to the other scan line drive circuit via a scan line, a delay may be produced in a set timing or reset timing of the flip flop, resulting in occurrence of a defective display.

Therefore, adjacent two or more scan lines are connected to the identical scan line drive circuit so that it is possible to prevent the delay from being produced between the plurality of flip flops corresponding to the adjacent scan lines and to prevent occurrence of a defective display.

In addition, in accordance with the electro-optical device according to the first aspect of the invention, each of the shift registers preferably includes an output switch and a reset/set type flip flop, and the shift register supplies a reset signal to the reset/set type flip flop of the shift register at the pre-stage via the scan line. With this configuration, since the output pulse of the flip flop at the present stage can be made to be the reset signal to the flip flop at the pre-stage, the flip flop at the pre-stage can be made in a reset state at an adequate timing.

Further, in accordance with the electro-optical device according to the first aspect of the invention, each of the shift registers preferably includes an output switch and a reset/set type flip flop, and the shift register supplies a set signal to the reset/set type flip flop of the shift register at the post-stage via the scan line. With this configuration, since the output pulse of the flip flop at the present stage can be made to be the set signal to the flip flop at the post-stage, the flip flop at the post-stage can be made in a set state at an adequate timing.

Furthermore, in accordance with the electro-optical device according to the first aspect of the invention, vertical clock signals having phases whose time periods of H-levels are not overlapped with each other, are respectively input to the first scan line drive circuit and the second scan line drive circuit. With this configuration, the outputs pulses output from the adjacent shift registers are made to not be overlapped with each other.

Furthermore, the electro-optical device according to the first aspect of the invention, preferably includes a pair of substrates opposing each other so as to sandwich a liquid crystal layer, thereby constituting the plurality of pixels, common and pixel electrodes provided so as to drive liquid crystal molecules in the liquid crystal layer, the common electrode being divided into divisional common electrodes, and control circuits that are respectively disposed at both sides of the scan lines and supply either one of a first voltage and a second voltage having a potential higher than that of the first voltage to the divisional common electrodes from both sides of the common electrodes.

In a specific control process, after the first voltage is applied to the common electrode by the control circuit, the selection voltage is applied to the scan line and an image signal with a positive polarity is supplied to the data line. In addition, after the second voltage is applied to the common electrode by the control circuit, the selection voltage is applied to the scan line and an image signal with a negative polarity is supplied to the data line. With this configuration, the first voltage and the second voltage can be applied to the common electrodes alternately for each one horizontal line, and the image signal with the positive polarity and the image signal with the negative polarity can be supplied to the voltages of the common electrodes alternately for each one horizontal line. As a result, a flicker between pixels can be cancelled, thereby preventing display quality from being degraded.

Furthermore, an electronic apparatus according to a second aspect of the invention includes the electro-optical device according to the first aspect of the invention. With this configuration, the scan line drive circuits can be provided at both sides of the display region in good balance, thereby achieving the electronic apparatus with the display panel having a reduced frame portion.

BRIEF DESCRIPTION OF THE DRAWINGS

The invention will be described with reference to the accompanying drawings, wherein like numbers reference like elements.

DESCRIPTION OF EXEMPLARY EMBODIMENTS

The preferred embodiments according to the invention will be described with reference to the accompanying drawings.

Figure 1:
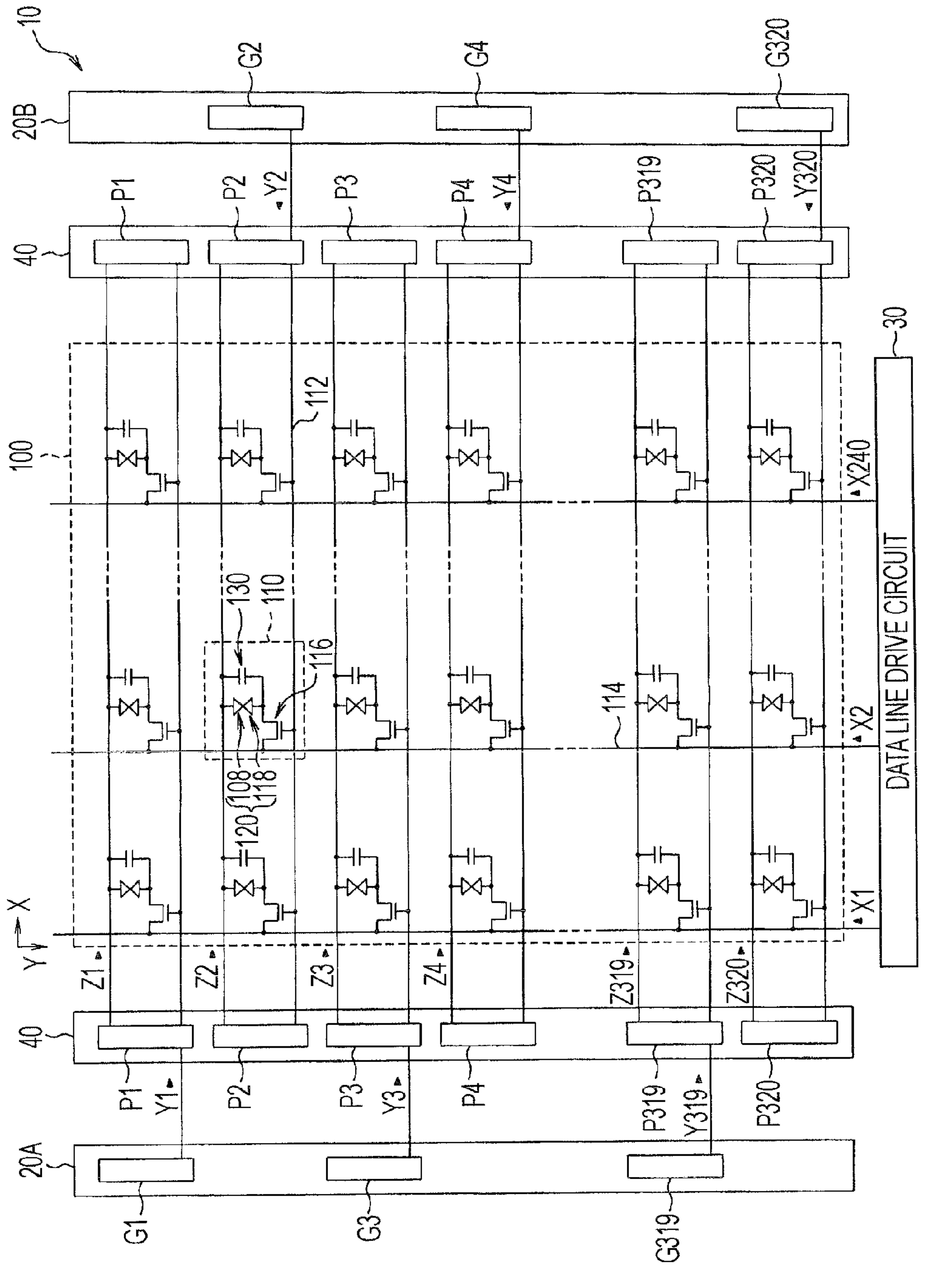
FIG. 1 is a block diagram showing a liquid crystal display device according to a first embodiment of the invention.

FIG. 1 is a block diagram showing a liquid crystal display device 10 as an electro-optical device according to a first embodiment of the invention. The liquid crystal display device 10 is equipped with a liquid crystal panel having an active matrix type thin-film transistor (TFT). As shown in FIG. 1, the liquid crystal display device 10 has a display region 100, and scan line drive circuits 20A and 20B, a data line drive circuit 30 and a common electrode drive circuit 40 are arranged at a peripheral of the display region 100. The liquid crystal panel is constituted in such a manner that an element substrate and an opposing substrate are stuck to each other so as to cause electrode formed faces to be opposed to each other with a predetermined gap therebetween and a liquid crystal is enclosed in the gap (not shown).

In the display region 100 provided in the liquid crystal panel, a plurality of scan lines 112 are arranged so as to extend in a direction (X), and a plurality of data lines 114 are arranged so as to extend in a direction (Y) and are electrically isolated with the scan lines 112. Pixels 110 are arranged so as to correspond to respective intersections between the scan lines 112 and the data lines 114. Each of the pixels 110 includes an n-channel type thin-film transistor (referred to as TFT hereinafter) 116 functioning as a pixel switching element, a pixel electrode 118, a common electrode 108 provided so as to face the pixel electrode 118, and a capacitor 130. Since the pixels 110 have the same structures, the description is made by using a pixel 110 positioned in an n-th row and an m-th column as a representative pixel. In the pixel 110 in the n-th row and m-th column, a gate electrode of the TFT 116 is connected to the scan line 112 in the n-th row, a source electrode of the TFT 116 is connected to the data line 114 in the m-th column, and a drain electrode is connected to the pixel electrode 118.

The common electrode 108 is divided into divisional common electrodes 108 for each one horizontal line corresponding to the scan lines 112. Each of the plurality of divisional common electrodes 108 obtained by dividing the common electrode for each horizontal line is formed of a transparent conductive material such as ITO (Indium Tin Oxide) disposed along the scan lines 112. A voltage VCOML (a first voltage) and a voltage VCOMH (a second voltage) having a potential higher than that of the voltage VCOML are alternately supplied to the common electrodes 108 as a common signal Z from a common electrode drive circuit 40. meanwhile, since the common electrodes 108 are formed of a transparent conductive material such as ITO (Indium Tin Oxide), common electrode wiring lines made of the same material of the scan lines 112 can be provided and connected to the plurality of common electrodes 108, respectively, in order to reduce the resistance of the common electrodes 108.

A pixel capacitor 120 is constituted in such a manner that a liquid crystal, i.e., one type of dielectric material is sandwiched between the pixel electrode 118 and the common electrode 108, thereby holding a differential voltage between the pixel electrode 118 and the common electrode 108. In the above structure, the pixel capacitor 120 varies its transmission light quantity in accordance with an effective value of its holding voltage. In the embodiment, the pixel electrode 118 and the common electrode 108 are formed on the identical substrate (element substrate). The liquid crystal of the liquid crystal display device 10 operates under an FFS (Fringe Field Switching) mode of a lateral electric field driving method. Scan line drive circuits 20A and 20B supply scan signals Y1, Y2, Y3 to Y320 corresponding to the selection voltages to the respective scan lines 112 in the first, second, third to 320-th rows over a time period of one frame. Namely, scan line drive circuits 20A and 20B select the scan lines 112 in a sequence of first, second, third to 320-th line and make all of the TFTs 116 connected to the selected scan line 112 be in an on-state (in a conductive state).

In the embodiment, the scan line drive circuits 20A and 20B are provided at the right and left sides of the display region 100 (both sides of the scan line 112). A predetermined number (116 lines, here) of scan lines 112 are connected to each of the scan line drive circuits 20A and 20B. In addition, the data line drive circuit 30 supplies data signals X1, X2, X3 to X240 to data lines in the first, second, third to 240-th columns, respectively, the data signals having voltages corresponding to display gradations of pixels 110 positioned on the scan lines 112 selected by the scan line drive circuits 20A and 20B. Here, the data line drive circuit 30 alternately performs positive polarity writing and negative polarity writing for each one horizontal line. In the positive polarity writing, the data signal having the positive polarity whose potential is higher than the voltage of the common electrode 108 is supplied to the data line 114 so as to write an image voltage according to the data signal having the positive polarity into the pixel electrode 118. In the negative polarity writing, the data signal having the negative polarity whose potential is lower than the voltage of the common electrode 108 is supplied to the data line 114 so as to write an image voltage according to the data signal having the negative polarity into the pixel electrode 118.

The common electrode drive circuits 40 are provided at the right and left sides of the display region 100 for a countermeasure against crosstalk (at both end sides of the common electrodes 108 and the inner sides of the scan line drive circuits 20A and 20B). The common electrode drive circuit 40 is equipped with unit control circuits P1 to P320 corresponding to the common electrodes 108. The unit control circuits P1 to P320 supply the voltage VCOML or voltage VCOMH to the respective common electrodes 108 as common signals Z1 to 2320. Before a scan signal Yn is supplied to the scan line 112 in the n-th row, the common signal Zn is supplied to the common electrode 108 in the n-th row.

A basic operation of the liquid crystal display device 10 constituted as the above is described below. First, the common electrode drive circuit 40 selectively applies the voltage VCOML or voltage VCOMH to each of the common electrodes 108 as the common signal Z. To be specific, the voltage VCOML and voltage VCOMH are alternately supplied to each of the common electrodes 108 for every time period of one frame. For example, in a case where the voltage VCOML is applied to the common electrode 108*p* in the p-th row (p is an integer of 1≦p≦320) in a certain time period of one frame, the voltage VCOMH is applied to the common electrode 108*p* in the next time period of one frame. In addition, the different voltages are applied to the adjacent common electrodes 108. In a case where, for example, the voltage VCOML is applied to the common electrode 108*p* in a certain time period of one frame, the voltage VCOMH is supplied to the electrode 108 (*p*−1) in the (p−1)-th row and the common electrode 108(*p*+1) in the (p+1)-th row in an identical time period of one frame.

Next, the scan line drive circuits 20A and 20B sequentially supply the scan signals Y1 to Y320 to the 320 rows of scan lines 112 so that all of the TFTs 116 connected to each of the scan lines 112 are sequentially made to be in an on-state and all of the pixels 110 corresponding to the scan lines 112 are sequentially selected. After that, synchronously with the selection of the pixels 110, the image signal having the positive polarity and the image signal having the negative polarity are supplied to the data line 114 from the data line drive circuit 30 in accordance with the voltage of the common electrode 108 alternately for each one horizontal line. To be specific, in a case where the voltage VCOML is applied to the common electrode 108*p* corresponding to the selected pixel 110 in the 320 rows of common electrodes 108, the image signal having the positive polarity is supplied to the data line 114. On the other hand, in a case where the voltage VCOMH is applied to the common electrode 108*p* corresponding to the selected pixel 110 in the 320 rows of common electrodes 108, the image signal having the negative polarity is supplied to the data line 114.

With the above processes, the data line drive circuit 30 supplies the image signals to all of the pixels 110 selected by the scan line drive circuit 20A or 20B via the data lines 114 and the TFTs 116 in the on-states so that the image voltages according to the image signals are written into the image electrodes 118. As a result, a potential difference is generated between the pixel electrode 118 and the common electrode 108 so that the drive voltage is applied to the liquid crystal. As the above, after the common electrode drive circuit 40 applies the voltage VCOML to the common electrode 108, the scan line drive circuit 20A or 20B supplies the scan signal Y to the scan line 112. After that, the data line drive circuit 30 supplies the image signal having the positive polarity to the data line 114. In addition, after the common electrode drive circuit 40 applies the voltage VCOMH to the common electrode 108, the scan line drive circuit 20A or 20B supplies the scan signal Y to the scan line 112. After that, the data line drive circuit 30 supplies the image signal having the negative polarity to the data line 114.

With the above configuration, since the voltage VCOML and the voltage VCOMH are applied to the common electrodes alternately for each one horizontal line and the image signal having the positive polarity and the image signal having the negative polarity are supplied to the common electrodes 108 alternately for each one horizontal line, a flicker between pixels can be canceled so that degradation of display quality can be suppressed. In FIG. 1, the scan line drive circuit 20A corresponds to a first scan line drive circuit, the scan line drive circuit 20B corresponds to a second scan line drive circuit, and the common electrode drive circuit 40 corresponds to a control circuit.

Next, structures of the scan line drive circuits 20A and 20B are described below. The scan lines 112 are connected to output terminals for selection voltages (the scan signals) of the scan line drive circuits 20A and 20B, alternately for each one scan line. To be specific, the scan lines 112 in the odd numbered rows are connected to the output terminals for the selection voltages of the scan line drive circuits 20A, and the scan lines 112 in the even numbered rows are connected to the output terminals for the selection voltages of the scan line drive circuits 20B. The scan line drive circuits 20A and 20B have a plurality of drivers G that are adapted to respectively supply the scan signals Y to the plurality of scan lines 112 connected to respective output terminals. Namely, the drivers G1, G3 to G319 for outputting the scan signals to be supplied to the scan lines 112 in the odd numbered rows belong to the scan line drive circuits 20A, and drivers G2, G4 to G320 for outputting the scan signals to be supplied to the scan lines 112 in the even numbered rows belong to the scan line drive circuits 20B. Here, the drivers G are constituted by shift registers provided corresponding to the scan lines 112 so as to supply output pulses received from the shift registers to the respective scan lines 112 as the scan signals Y.

Figure 2:
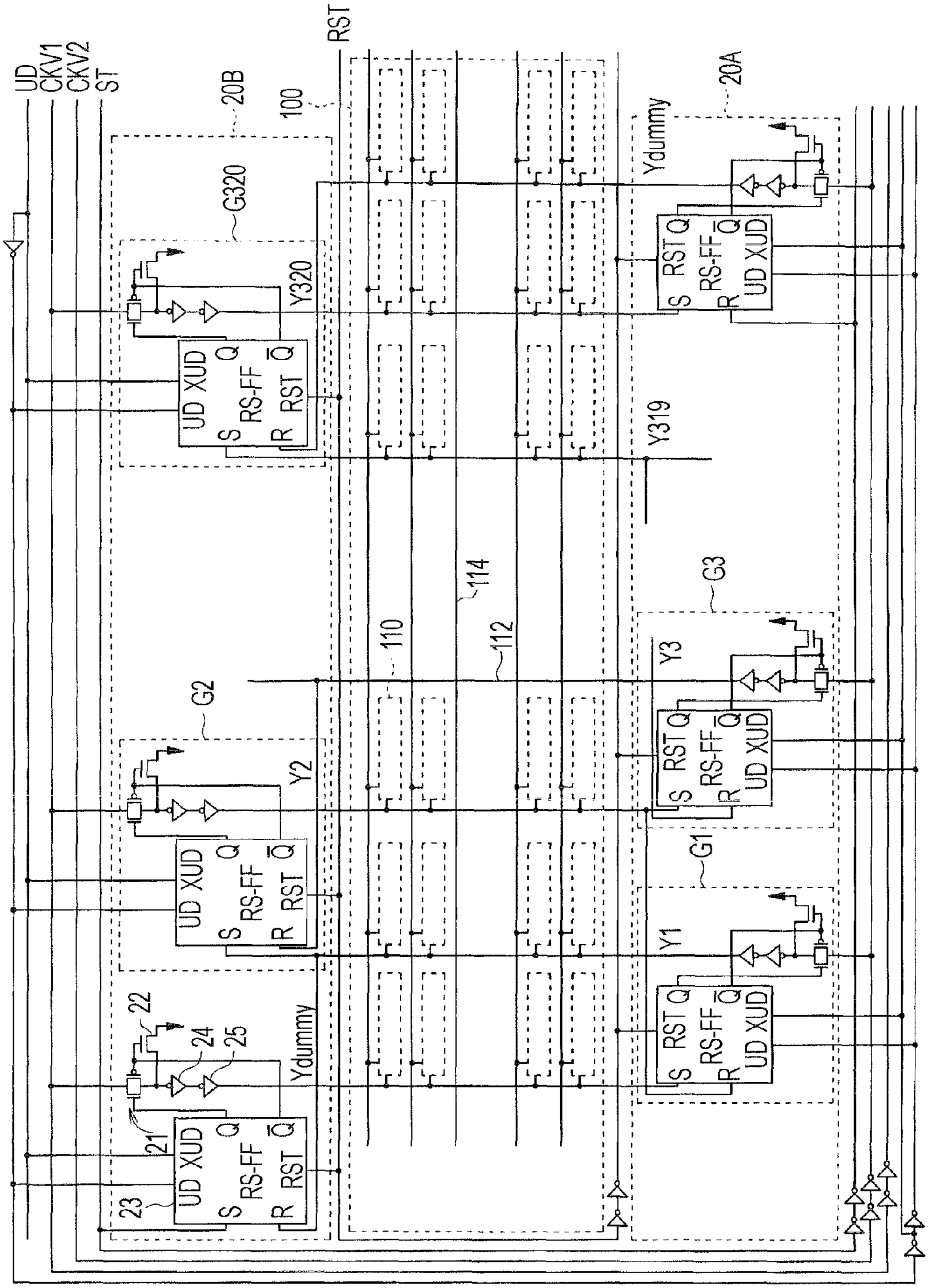
FIG. 2 is a block diagram showing a scan line drive circuit according to the first embodiment of the invention.

FIG. 2 is a block diagram showing a specific structure of each of the scan line drive circuits 20A and 20B. In FIG. 2, the common electrode drive circuit 40 is omitted. Vertical clock signals CKV1 and CKV2, a scanning direction switching signal UD, a start signal ST and a reset signal RST are input to each of the scan line drive circuits 20A and 20B. Here, each of the vertical clock signals CKV1 and CKV2 is a positive logic signal and the vertical clock signals CKV1 and CKV2 have phases causing time periods of H levels to not be overlapped with each other. The vertical clock signals CKV1 and CKV2 are set such that the time periods of the H levels are shorter than those of the respective L levels. The scanning direction switching signal UD is a signal for designating a shift direction (a scanning direction) of a shift pulse and the start signal ST is a signal for designating the start of scanning.

Each of the scan line drive circuits 20A and 20B has 161 stages of shift registers constituted by 160 stages of drivers G corresponding to the 160 scan lines 112 connected to their own output terminals and one dummy stage. The vertical clock signal CKV2 is input to the shift registers of the scan line drive circuit 20A and the vertical clock signal CKV1 is input to the shift registers of the scan line drive circuit 20B. The shift register in each stage is composed of an output switch 21, an n-type transistor 22, a reset/set type flip flop (RS-FF) 23 and inverters 24 and 25. The RS-FF 23 outputs output signals Q and /Q (Qbar) that become active when a set signal S is input. Here, the output signal Q is a positive logic signal and the output signal /Q is a negative logic signal.

The output signals Q and /Q are input to each of the output switches 21 provided corresponding to the RS-FFs 23. The output signal /Q is also input to the n-type transistor 22. In addition, the RS-FF 23 is constituted so as to output the output signals Q and /Q each entering a non-active state when a reset signal R is input thereto. Namely, the output pulse Y(n−1) of the shift register corresponding to the scan line 112 in the (n−1)-th row is input to the RS-FF 23 of the shift register corresponding to the scan line 112 in the n-th row via the scan line 112 in the (n−1)-th row as the set signal S. Further, the output pulse Y(n+1) of the shift register corresponding to the scan line 112 in (n+1)-th row is input to the RS-FF 23 of the shift register corresponding to the scan line 112 in the n-th row via the scan line 112 in the (n+1)-th row as the reset signal R. Thus, the application of signals between the shift registers belonging to the scan line drive circuit 20A and the shift registers belonging to the scan line drive circuit 20B is carried out via the scan lines 112.

Figure 3:
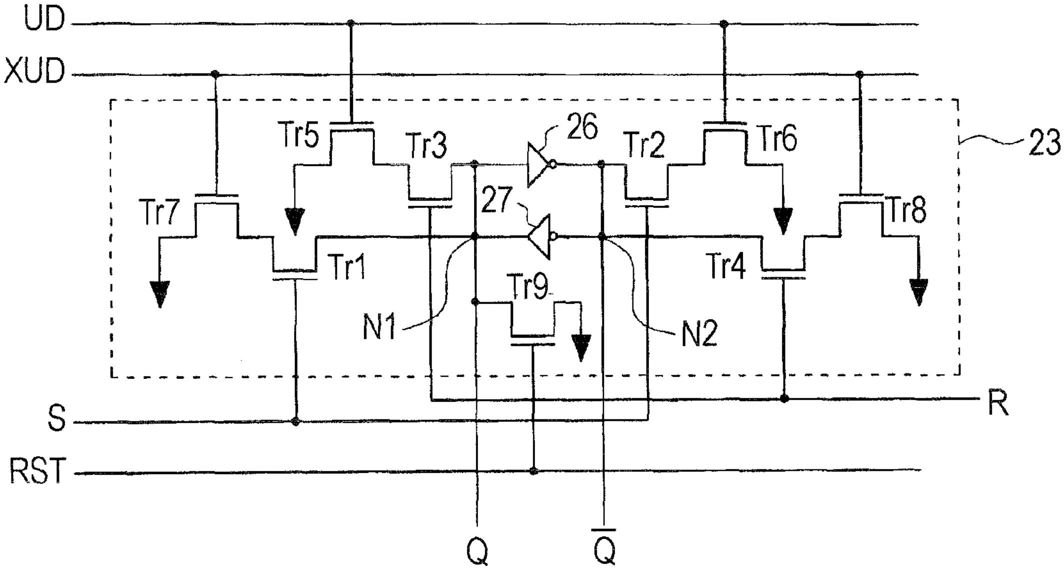
FIG. 3 is diagram showing a circuit structure of an RS-FF.

FIG. 3 is a block diagram showing a circuit structure of the RS-FF 23. As shown in FIG. 3, the RS-FF 23 is composed of n-type transistors Tr1 to Tr4 for setting or resetting, n-type transistors Tr5 to Tr4 for switching a scanning direction, an n-type transistor Tr9 for stabilizing an output node and inverters 26 and 27. Here, a latch circuit is constituted by the inverters 26 and 27. The inverter 26 and the inverter 27 are inversely connected to each other (the input terminal of the inverter is connected to the output terminal of the inverter 27, and the output terminal of the inverter 26 is connected to the input terminal of the inverter 27) so as to maintain each of nodes N1 and N2 to be in a complementary level.

Drains of the transistors Tr1 and Tr3 are connected to the node N1 of the latch circuit of the RS-FF 23 and drains of transistors Tr2 and Tr4 are connected to the node N2 of the latch circuit. The n-type transistors Tr5 to Tr8 for switching a scanning direction are serially connected to the transistors Tr1 to Tr4, respectively. Sources of the transistors Tr5 to Tr8 are respectively connected to negative power source potentials. As a result, sources of the transistors Tr1 to Tr4 are connected to the negative power source potentials via the respective transistors for switching the scanning direction.

Gates of the transistors Tr1 and Tr2 are connected to the set terminal so as to be supplied with the set signal S, and gates of the transistors Tr3 and Tr4 are connected to the reset terminal so as to be supplied with the reset signal R. In addition, gates of the transistors Tr5 and Tr6 are supplied with the scanning direction switching signal UD and gates of the transistors Tr7 and Tr8 are supplied with a scanning direction switching signal XUD that is an inverted signal of the scanning direction switching signal UD. Gate of the transistor tr9 is supplied with the reset signal RST. Here, the scanning direction switching signals UD and XUD are configured such that when the scanning direction of the shift pulse is in a forward scan (left to right in FIG. 2), the signal UD is made to have an H level and the signal XUD is made to have an L level, and when the scanning direction of the shift pulse is in a backward scan (right to left in FIG. 2), the signal UD is made to have an L level and the signal XUD is made to have an H level.

When the signal UD is in the H level state and the signal XUD is in the L level state, each of the transistors Try and Tr6 for switching the scanning direction is made to have an on-state and each of the transistors Tr7 and Tr8 for switching the scanning direction is made to have an off-state. Therefore, when the set signal S is made to have the H level under the above conditions, each of the transistors Tr1 and Tr2 is made to have a conductive state. However, the negative power source potential is supplied to only the transistor Tr2 and the potential of the node N2 of the latch circuit is made to have the L level so that the output signal Q in the H level is output from an RS-FF 34. When the reset signal R is made to have the H level after that, each of the transistors Tr3 and Tr4 is made to have the conductive state. However, the negative power source potential is supplied to only the transistor Tr3 and the potential of the node N1 of the latch circuit is made to have the L level so that the output signal Q in the L level is output from the RS-FF 34.

When the signal UD is in the L level and the signal XUD is in the H level, each of the transistors Try and Tr6 for switching the scanning direction is made to have the off-state and each of the transistors Tr7 and Tr8 is made to have the on-state. Therefore, when the set signal S is made to have the H level under the above conditions, each of the transistors Tr1 and Tr2 is made to have the conductive state. However, the negative power source potential is supplied to only the transistor Tr1 so that the output signal Q in the L level is output from the RS-FF 34. Namely, at that time, the RS-FF 34 performs an operation similarly as in the above described case that the signal UD is in the H level, the signal XUD is in the L level and the reset signal R is in the H level.

After that, when the reset signal R is made to have the H level, each of the transistors Tr3 and Tr4 is made to have the conductive state. However, the negative power source potential is supplied to only the transistor Tr4 so that the output signal Q in the H level is output from the RS-FF 34. Namely, at that time, the RS-FF 34 performs an operation similarly as in the above described case that the signal UD is in the H level, the signal XUD is in the L level and the reset signal R is in the H level.

By controlling the potentials of the scanning direction switching signals UD and XUD as described above, the direction of the input to the latch circuit can be switched so that controlling of the scanning direction of the shift pulse can be performed. Here, in a case where the scanning direction of the shift pulse is in the backward, the set terminal in FIG. 3 functions as the reset terminal and the reset terminal in FIG. 3 functions as the set terminal. Namely, the reset signal R input to the gates of the transistors Tr3 and Tr4 functions as the set signal S and the set signal S input to the gates of the transistors Tr1 and Tr2 functions as the reset signal R. In addition, the RS-FF 23 makes the transistor Tr9 to be in the conductive state by making the reset signal RST to be in the H level so as to fix the node N1 of the latch circuit to be in the L level.

With the above configuration, when the set signal S input to the set terminal is made to have the active state in the forward scanning, the RS-FF 23 is set so as to output the output signal Q in the H level from the output terminal. Even when the set signal is made to have the inactive state, the RS-FF 23 maintains its output state. When the reset signal R input to the reset terminal is made to have the active state, the RS-FF 23 is reset so as to output the output signal Q in the L level. After that, even when the reset signal R is made to have the inactive state, the RS-FF 23 maintains its state until the set signal S is made to have the active state at the next time. On the other hand, during the backward scanning, when the reset signal R input to the reset terminal is made to have the active state, the RS-FF 23 is set so as to output the output signal Q in the H level from the output terminal. Then, even when the reset signal R is made to have the inactive state, the RS-FF 23 maintains its output state. When the set signal S input to the set terminal is made to have the active state, the RS-FF 23 is reset so as to output the output signal Q in the L level. After that, even when the set signal S is made to have inactive state, the RS-FF 23 maintains its state until the reset signal R is made to have the active state at the next time.

The output switch 21 is in an on-state while the output signals Q and /Q are in the active states (Q=H level, /Q=L level). During the time period of the on-state, the vertical clock signal CKV1 or CKV2 is output as the output pulse Y via the inverters 24 and 25. Namely, while the output switch 21 is in the on-state, the output pulse Y having a pulse width the same as that of the clock signal CKV1 or CKV2 is output in synchronism with the clock signal CKV1 or CKV2. On the other hand, while the output signals Q and /Q are in the inactive states (Q=L level, /Q=H level) and the output switch 21 is in the off-state, the n-type transistor 22 to which the output signal /Q is input, is in the conductive state. As a result, the output pulse Y in the L level is output.

Thus, shift registers of the scan line drive circuits 20A and 20B sequentially output the output pulses Y (the scan signals) to the scan lines 112 from the scan line 112 in the uppermost stage to the scan line 112 in the lowermost stage in the display region 100 (in the case of the backward scanning, from the scan line 112 in the lowermost stage to the scan line 112 in the uppermost stage in the display region 100) in synchronism with rising or falling of the vertical clock signal CKV1 or CKV2. Here, a dummy pixel may by provided at the scan line of the dummy to be supplied with an output pulse Ydummy of the shift register in the dummy stage. Note that, while a case that the RS-FF 23 has a circuit structure shown in FIG. 3 is described above, there are no restrictions on the circuit structure, as long as the RS-FF 23 is a flip flop capable of performing the above described operations. A circuit structure capable of obviating the need of the dummy stage can be used. Meanwhile, as a general structure of the liquid crystal display device, the structure is known that has a scan line drive circuit 1020 disposed at one side of the display region 100 as shown in FIG. 4.

Figure 4:
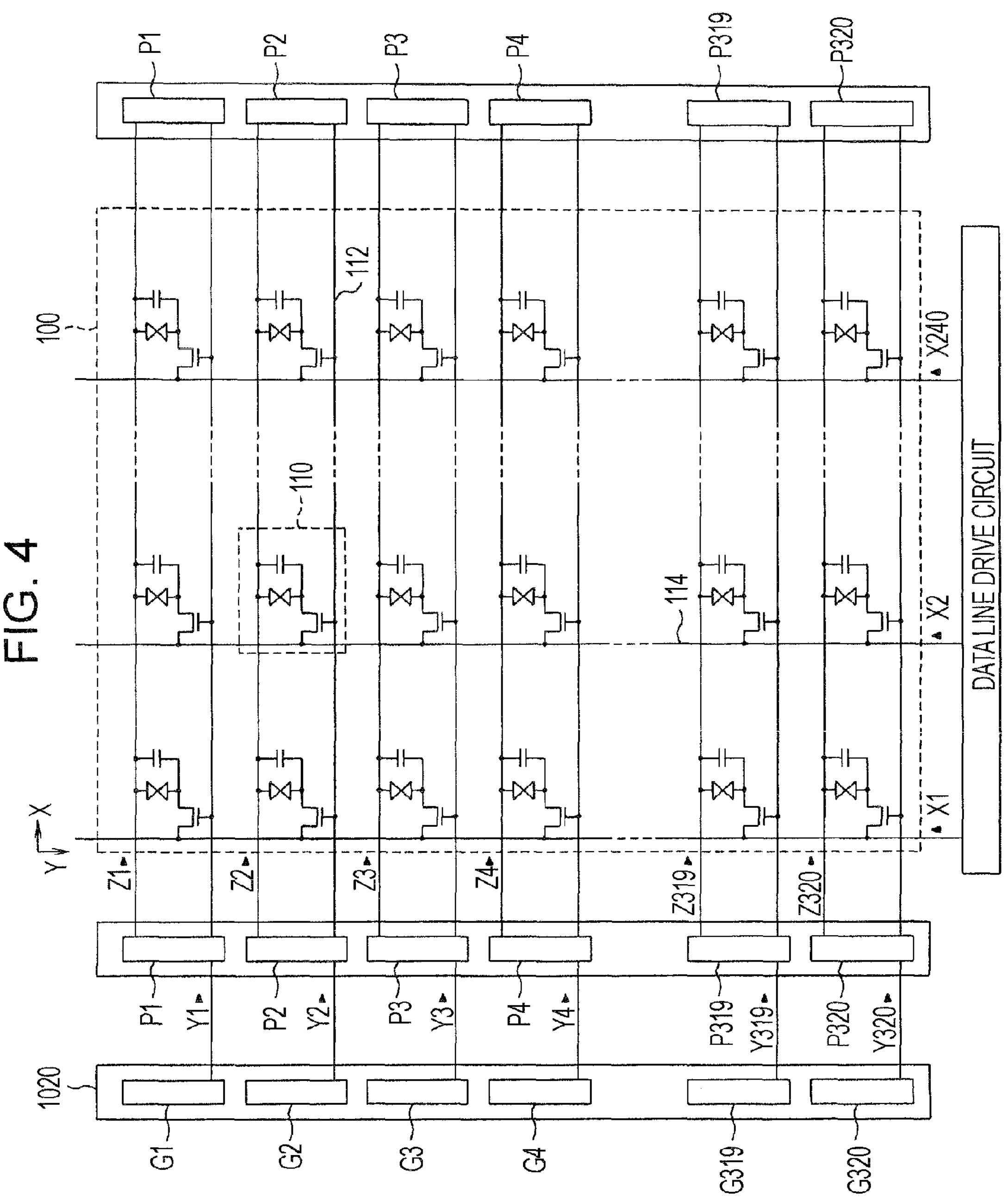
FIG. 4 is a block diagram showing a general liquid crystal display device.
Figure 5:
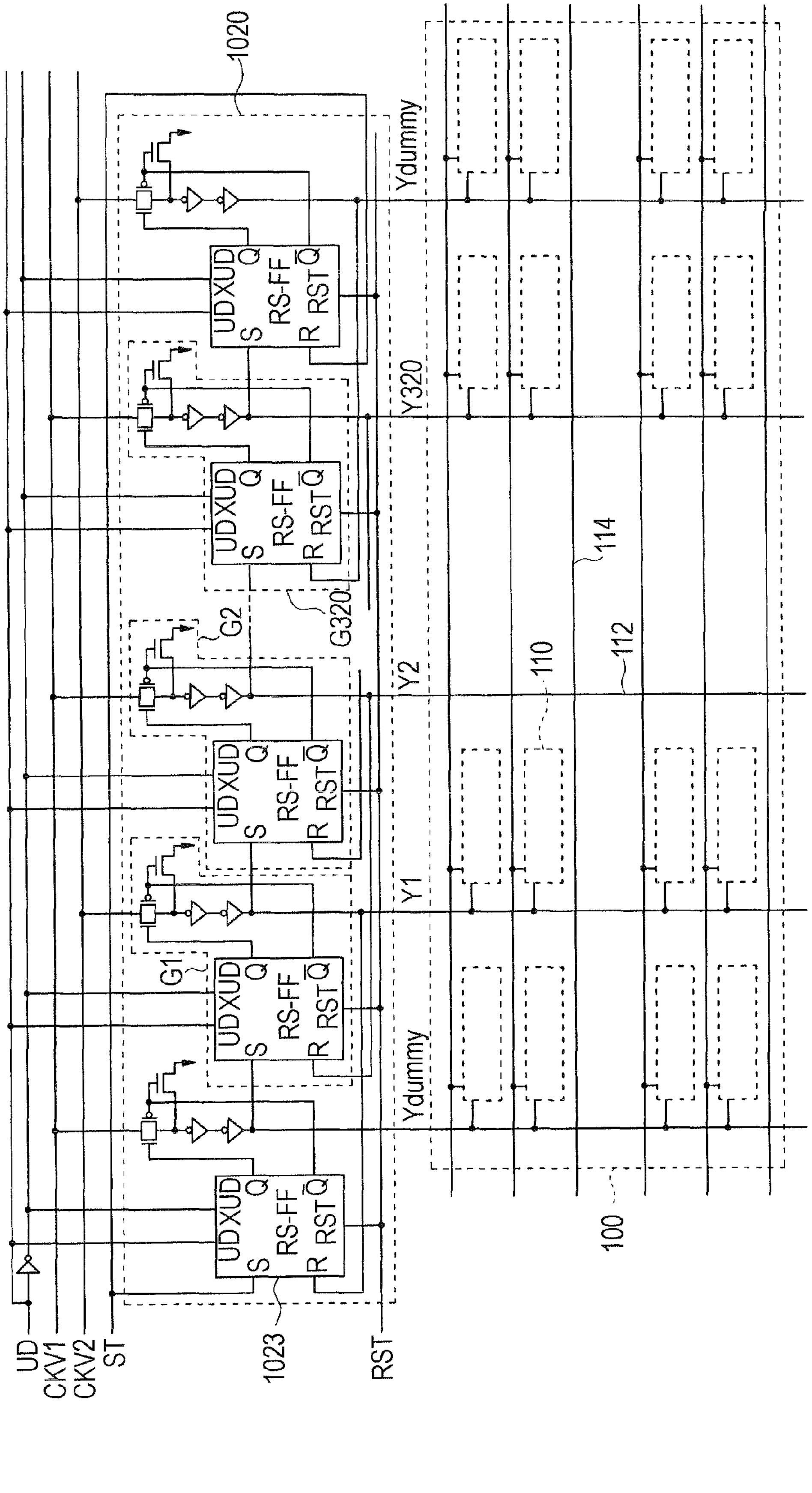
FIG. 5 is a block diagram showing a specific structure of the scan line drive circuit shown in FIG. 4.

FIG. 5 is a block diagram showing a specific structure of the scan line drive circuit 1020 shown in FIG. 4. The scan line drive circuit 1020 has 322 stages of shift registers composed of 320 stages of drivers G1 to G320 corresponding to 320 scan lines 112 and two dummy stages, and the vertical clock signals CKV1 and CKV2 are input to the stages, alternately for each one stage. Here, the vertical clock signal CKV2 is input to the shift registers in the odd numbered stages and the vertical clock signal CKV1 is input to the shift registers in the even numbered stages. In addition, an RS-FF 1023 may output output signals Q and /Q which become active when an output pulse from a shift register at the precedent stage is input as a set signal S. Further, the RS-FF 1023 may output output signals Q and /Q which become inactive when an output pulse from a shift register at the precedent stage is input as a reset signal R. Note that, the structure of the RS-FF 1023 is the same as that of the RS-FF 23 shown in FIG. 3.

As understood by comparing FIG. 2 and FIG. 5 with each other, the scan line drive circuits 20A and 20B are respectively provided at both sides of the display region 100 and the scan lines 112 are connected to the output terminals for the selection voltages of the scan line drive circuits 20A and 20B alternately for each one scan line in the embodiment. As a result, the number of drivers G belonging to one scan line drive circuit 20A or 20B can be made a half of that of the scan line drive circuit 1020 that is provided at one side of the display region 100. Since the scan line drive circuit 1020 is provided at one side of the display region 100 in the liquid crystal display device shown in FIG. 4, a dead space may be made at one side where the scan line drive circuit 1020 is not disposed in a case where right and left areas of a frame portion are made equalized. Contrary to the above, in the embodiment, the scan line drive circuits 20A and 20B can be arranged at both sides of the display region 100 in good balance so that a dead space is not produced.

Thus, in the first embodiment, the scan line drive circuits 20A and 20B can be arranged at both sides of the display region 100 in good balance and the number of drivers G belonging to one of the scan line drive circuit 20A or 20B can be made half of the scan line drive circuit that is provided at one side of the display region so that an area of the circuit can be reduced, thereby realizing the frame portion having the reduced area of the display panel. In addition, in a case where an output pulse of a shift register belonging to one of the scan line drive circuit 20A or 20B is input to a flip flop belonging to the other scan line drive circuit 20B or 20A, the output pulse is input thereto via the scan line 112. As a result, it is possible to form a structure in which scanning can be stopped when the scan line 112 is broken so that checking of the disconnection of the scan line 112 can be performed. Further, since the COM divisional driving method wherein the common electrode 108 is divided into the plurality of divisional common electrodes 108 and voltages having different potentials are supplied to the respective divisional common electrodes 108, is utilized, it is possible to improve display quality of an image. Furthermore, even when it is necessary to enlarge the area of the frame portion because of arrangement of the drivers G for COM divisional driving, it is possible to suppress the degree of enlargement by using the scan line drive circuits 20A and 20B having the above described structures.

Figure 6:
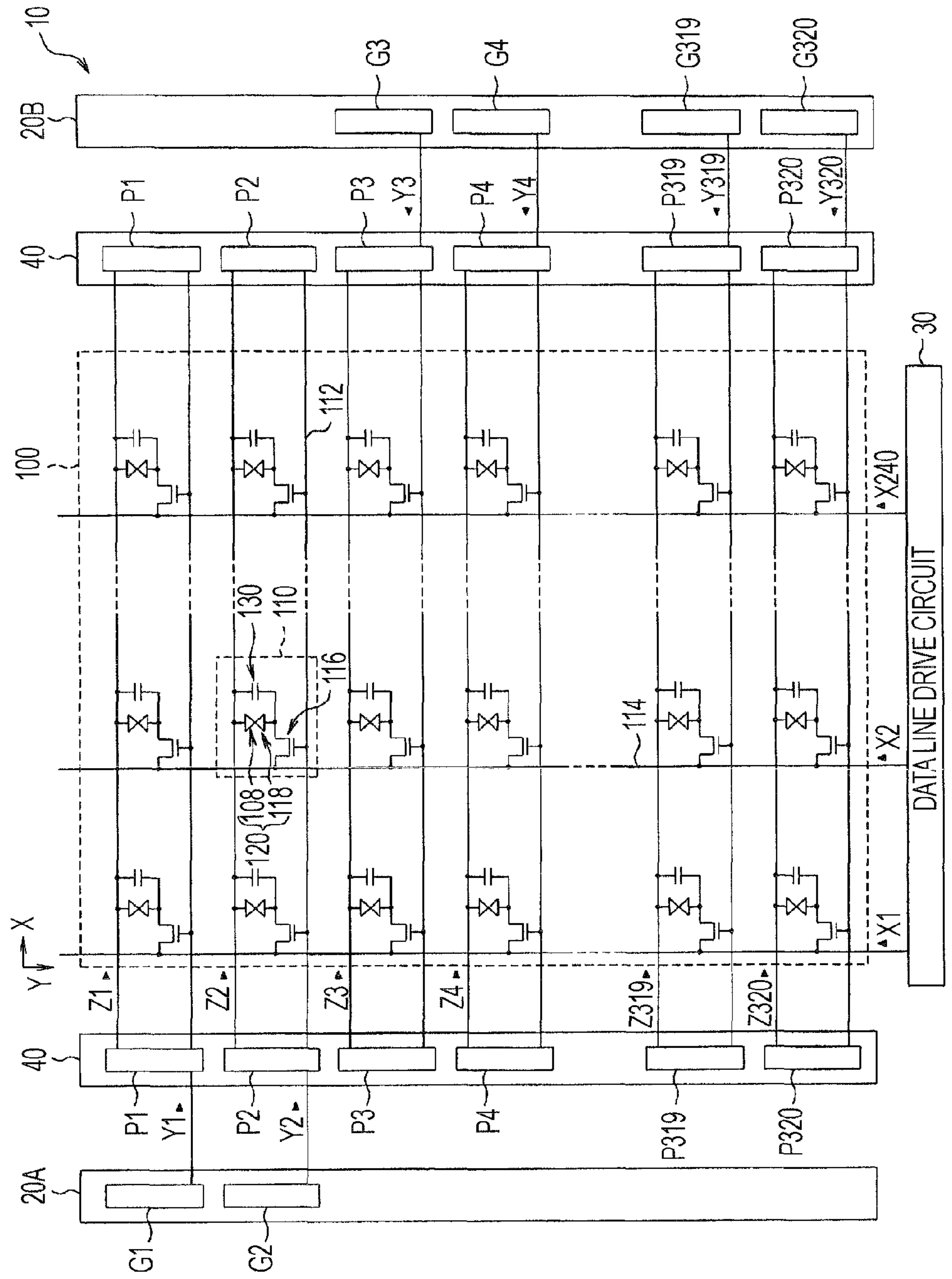
FIG. 6 is a block diagram showing a liquid crystal display device according to a second embodiment of the invention.

Next, a second embodiment of the invention is described below. While the scan lines 112 are connected to the output terminals for the selection voltages of the scan line drive circuits 20A and 20B alternately for each one scan line in the first embodiment, the scan lines 112 are connected thereto alternately for each two scan lines in the second embodiment. FIG. 6 is a block diagram showing a structure of a liquid crystal display device 10 according to the second embodiment. The liquid crystal display device 10 in the second embodiment has a structure similar to that of the liquid crystal display device 10 shown in FIG. 1 excluding a point that the structures of the scan line drive circuits 20A and 20B in the liquid crystal display device 10 according to the first embodiment are different from those of the second embodiment. Therefore, a part having the structure different from that of the first embodiment is mainly described below.

The scan lines 112 are connected to the output terminals for the selection voltages of the scan line drive circuits 20A and 20B alternately for each two scan lines. Namely, the drivers G1, G2, G5, G6 to G317 and G318 for outputting the scan signals to be supplied to the scan lines 112 in the first, second, fifth, sixth through 317th and 318th rows, belong to the scan line drive circuit 20A, and the drivers G3, G4, G7, G8 through G319 and G320 for outputting the scan signals to be supplied to the scan lines 112 in the third, fourth, seventh, eighth through 319th and 320th rows, belong to the scan line drive circuits 20B.

Figure 7:
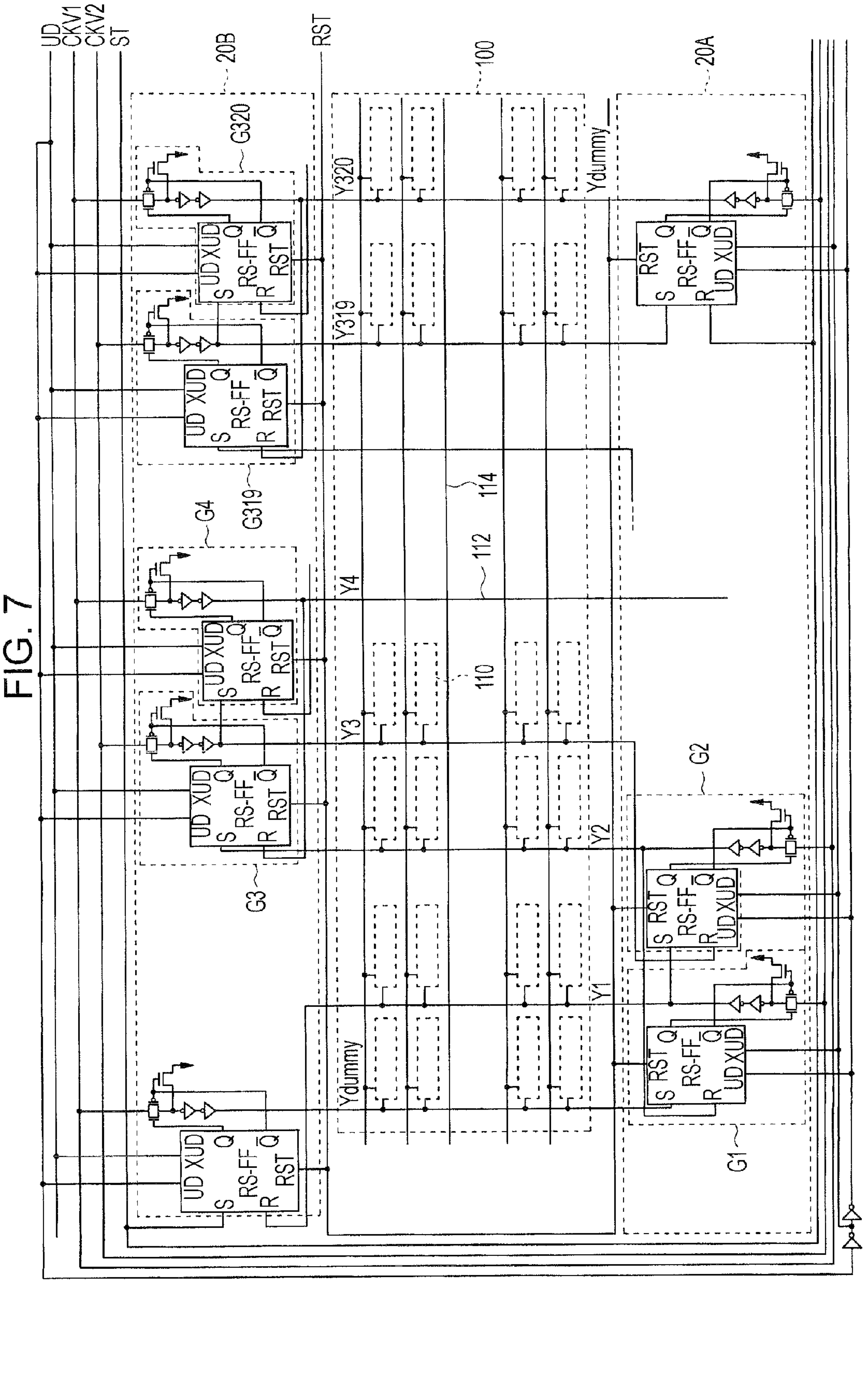
FIG. 7 is a block diagram showing a specific structure of the scan line drive circuit according to the second embodiment of the invention.

FIG. 7 is a block diagram showing specific structures of the scan line drive circuits 20A and 20B according to the second embodiment. In FIG. 7, a structure of each of shift registers is similar to that of the shift register in the first embodiment. Similarly to the first embodiment, an output pulse Y(n−1) of the shift register corresponding to the scan line 112 in the (n−1)-th row is input to an RS-FF 23 of the shift register corresponding to the scan line 112 in the n-th row as a set signal S. In addition, an output pulse Y(n+1) of the shift register corresponding to the scan line 112 in the (n+1)-th row is input to an RS-FF 23 of the shift register corresponding to the scan line 112 in the nth row as a reset signal R.

At that time, the set signal S input to the RS-FF 23 of the shift register corresponding to the scan line 112 in the odd numbered row is input from the shift register belonging to the scan line drive circuit provided at the opposite side by passing through the scan line 112. The reset signal R is input from the adjacent shift register without passing through the scan line 112. In addition, the set signal S input to the RS-FF 23 of the shift register corresponding to the scan line 112 in the even numbered row is input from the adjacent shift register without passing through the scan line 112. The reset signal R is input through the scan line 112 from the shift register belonging to the scan line drive circuit provided at the opposite side.

Meanwhile, in a case where the output pulse of the shift register is input to the RS-FF 23 of the shift register belonging to the scan line drive circuit provided at the opposite side through the scan line 112, a delay may be produced on an input timing of the output pulse to the RS-FF 23 as compared to a case that inputting is performed from the adjacent shift register without passing through the scan line 112. Thus, when the input timing of the output pulse is deviated, a set timing and a reset timing of the RS-FF 23 are deviated, which may cause a display defective. In contrast with the above, since the scan lines 112 are connected to the output terminals for the selection voltages of the scan line drive circuits 20A and 20B alternately for each two scan lines, the set signal S or the reset signal R of each of the RS-FFs 23 can be input from the adjacent shift register without passing through the scan line 112.

Thus, since adjacent two scan lines 112 are connected to the output terminals for the selection voltage of the identical scan line drive circuit 20A or 20B so that it is possible to produce the above delay between two flip flops corresponding to the adjacent scan lines 112, thereby suppressing occurrence of defective display. Note that, while it is described that the scan lines 112 are connected to the output terminals for the selection voltage of the scan line drive circuits 20A and 20B alternately for each two scan lines in the above second embodiment, the number for alternation can be changed to three or more. In addition, it is described that the scan lines are connected to the output terminals for the selection voltages of the scan line drive circuits 20A and 20B alternately for each predetermined number of scan lines 112 in each of first and second embodiments, it is possible to connect the scan lines to the output terminals alternately for different numbers of scan lines 112.

Further, while the case utilizing the COM divisional driving method wherein the common electrode is divided into the plurality of divisional common electrodes and the first or second voltage is supplied to the respective divisional common electrodes, is described in each of the embodiments, a structure not using the COM divisional driving method (the common electrode is not divided) can be formed. While the case in which the FFS method is utilized as a driving method of a liquid crystal is described in each of the embodiments, a TN method or an IPS method can be utilized. While the case in which the invention is applied to the liquid crystal display device, the invention can be applied to a display device with the use of an electro-optical material except a liquid crystal, for example, a display device with the use of an organic EL material or a plasma discharge element. Furthermore, the electro-optical device according to each of the embodiments can be used as a display device mounted on an electronic apparatus. To be specific, as the electronic apparatus, a monitor, a TV, a note PC, a PDA device, a digital camera, a video camera, a mobile phone, a mobile photo viewer, a mobile video player, a mobile DVD player, or a mobile audio player can be given.

The entire disclosure of Japanese Patent Application No. 2008-261366, filed Oct. 8, 2008 is expressly incorporated by reference herein.

What is claimed is:

1. An electro-optical device comprising:
- a plurality of scan lines;
- a plurality of data lines;
- a plurality of pixels respectively provided at intersections between the plurality of scan lines and the plurality of data lines; and
- a scan line drive circuit that applies a selection voltage to the scan lines in a predetermined sequence, the scan line drive circuit including:
- (a) a first scan line drive circuit:
  - (i) disposed at one side of the scan line;
  - (ii) being configured to apply the selection voltage to some of the scan lines;
  - (iii) being configured to control a first shift pulse to change from a first direction to a second direction; and
  - (iv) including shift registers with a reset/set type flip flop provided corresponding to the some of the scan lines, each of the reset/set type flip flops including a set terminal and a reset terminal; and
- (b) a second scan line drive circuit:
  - (i) disposed at the other side of the scan line;
  - (ii) being configured to apply the selection voltage to the remaining scan lines;

(iii) being configured to control a second shift pulse to change from a third direction to a fourth direction; and (iv) including shift registers with a reset/set type flip flop provided corresponding to the remaining scan lines, each of the reset/set type flip flops including a set terminal and a reset terminal, wherein the set terminal functions as the reset terminal and the reset terminal functions as a set terminal for each of the reset/set type flip flops when a scanning direction switching signal changes, the changing of the set and reset terminals causes the first shift pulse to change to the second direction, and the changing of the set and reset terminals causes the second shift pulse to change to the fourth direction.

2. The electro-optical device of claim 1, wherein:

supplying of signals between the shift registers belonging to the first scan line drive circuit and the shift registers belonging to the second scan line drive circuit, is performed via the scan lines.

3. The electro-optical device of claim 1, wherein the plurality of scan lines are connected to output terminals of the selection voltage of the first scan line drive circuit and the second scan line drive circuit alternately for each one scan line.

4. The electro-optical device of claim 1, wherein the plurality of scan lines are connected to output terminals of the selection voltage of the first scan line drive circuit and the second scan line drive circuit alternately for each two or more scan lines.

5. The electro-optical device of claim 2, wherein:

(a) each of the shift registers includes an output switch; and (b) the shift register supplies a reset signal to the reset/set type flip flop of the shift register at a pre-stage via the scan line.

6. The electro-optical device of claim 2, wherein:

(a) each of the shift registers includes an output switch; and (b) the shift register supplies a set signal to the reset/set type flip flop of the shift register at a post-stage via the scan line.

7. The electro-optical device of claim 1, wherein vertical clock signals having phases whose time periods of H-levels are not overlapped with each other, are respectively input to the first scan line drive circuit and the second scan line drive circuit.

8. The electro-optical device of claim 1, which includes:

(a) a pair of substrates opposing each other so as to sandwich a liquid crystal layer, thereby constituting the plurality of pixels;

(b) common and pixel electrodes provided so as to drive liquid crystal molecules in the liquid crystal layer, the common electrode being divided into divisional common electrodes; and (c) control circuits that are respectively disposed at both sides of the scan line and supply either one of a first voltage and a second voltage having a potential higher than that of the first voltage to the divisional common electrodes from both sides of the common electrodes.

9. An electronic apparatus comprising:

an electro-optical device comprising:

a plurality of scan lines;

a plurality of data lines;

a plurality of pixels respectively provided at intersections between the plurality of scan lines and the plurality of data lines; and a scan line drive circuit that applies a selection voltage to the scan lines in a predetermined sequence, the scan line drive circuit including:

(a) a first scan line drive circuit:

disposed at one side of the scan line;

(ii) being configured to apply the selection voltage to some of the scan lines;

(iii) being configured to control a first shift pulse to change from a first direction to a second direction; and (iv) including shift registers with a reset/set type flip flop provided corresponding to the some of the scan lines, each of the reset/set type flip flops including a set terminal and a reset terminal; and (b) a second scan line drive circuit:

(i) disposed at the other side of the scan line;

(ii) being configured to apply the selection voltage to the remaining scan lines;

(iii) being configured to control a second shift pulse to change from a third direction to a fourth direction; and including shift registers with a reset/set type flip flop provided corresponding to the remaining scan lines, each of the reset/set type flip flops including a set terminal and a reset terminal, wherein the set terminal functions as the reset terminal and the reset terminal functions as a set terminal for each of the reset/set type flip flops when a scanning direction switching signal changes, the changing of the set and reset terminals causes the first shift pulse to change to the second direction, and the changing of the set and reset terminals causes the second shift pulse to change to the fourth direction.

* * * * *